Patented May 7, 1935

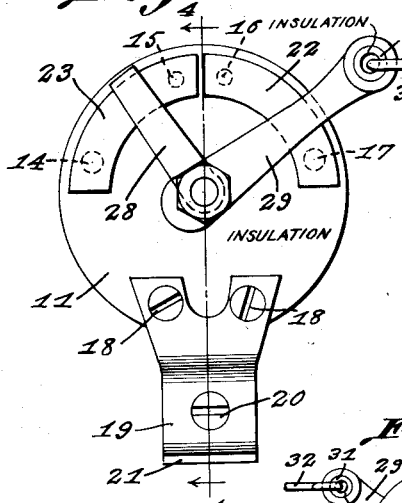
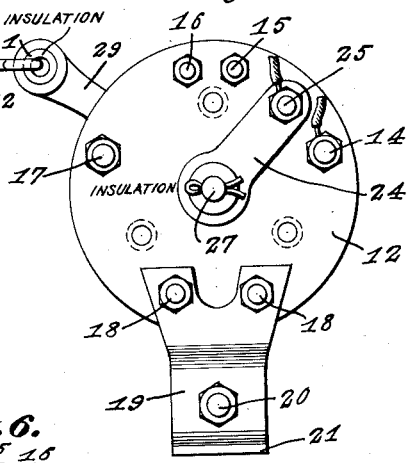
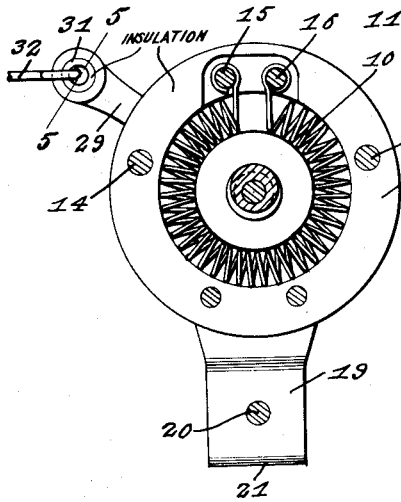
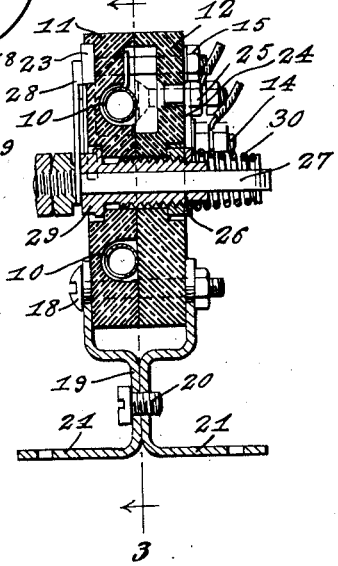

2,000,125

UNITED STATES PATENT OFFICE 2,000,125

REGULATOR FOR CHARGING GENERATORS

Francis P. Clesi, Charles B. Cousley, and Clarence Meyers, New Orleans, La.

Application September 26, 1932, Serial No. 634,974

1 Claim. (Cl. 201—48)

The object of the invention is to provide a device for the use as part of the equipment of an auto vehicle, or any other machinery which necessitates a generator for the purpose of charging a battery, which will automatically control the electrical currents of the generator so that a maximum output of electricity may be had at any desired speed above fifteen miles per hour; to provide a device with either a fixed or variable resistance coil to adjust the various maximum charging rates of the different types of generators, for a mean desired maximum charge output; a device which would provide any desired amperage above fifteen miles per hour; a device which would provide any desired amperage, without variation at high speeds; a device which would automatically prevent a generator from overcharging due to the attainment of a high speed of the vehicle motor by which it is driven, thus preserving the generator from the deleterious effects of high speed as well as also preserving the vehicle battery from the effects of a too high charging rate; a device which would provide a maximum charging rate at deceleration of motor to which generator is connected; to provide a device readily applicable to a vehicle generator without any moderations thereof; and to provide a controlling device of the kind indicated, which is of simple form and therefore susceptible of cheap manufacture.

With this object in view, the invention consists in a construction and combination of parts of which a preferred embodiment is illustrated in the accompanying drawing, wherein:

Fig. 1 is an elevational view of the invention looking at one side.

Fig. 2 is a similar view but looking at the other side.

Fig. 3 is a sectional view on the plane indicated by the line 3—3 of Fig. 4.

Fig. 4 is a sectional view on the plane indicated by the line 4—4 of Fig. 1.

Fig. 5 is a detail sectional view on the line indicated by the line 5—5 of Fig. 3.

Fig. 6 is a similar view of Fig. 3, however showing adjustable conductor strip.

The conventional method of controlling the charging rate of a vehicle generator by means of changing the position of the third brush, or what is commonly known as the control brush, is not employed when the present invention is used. Since the third or control brush controls the field current of the generator the same effect can be secured by the interposition of a variable or fixed resistance in the field circuit between the third or control brush and that terminal of the field coil to which it is connected. It can also be connected to any end of the field coil and can be built in the field coils and controlled by a governor, control arm or contact block either by vacuum governed by the speed of the motor or any movable rod, arm, governor or wire which governs the speed of the motor or by a belt and pulley, or by gears governed by the speed of the motor. A resistance is employed in the present instance and consists of a coil 10 of resistance wire enclosed wholly or partially within a casing consisting of the complemental disc-like elements 11 and 12, which are secured together by means of the bolts 14, 15 and 17, as well as by the bolts 18, which latter bolts secure the bracket 19 to the casing. The bracket 19 consists of one or two complemental elements having web portions secured together by means of a screw 20, the two elements being bent outwardly at the bottom to provide a base 21 by which the device may be supported and secured to any appropriate part of the vehicle. The element 11 of the casing is formed with an annular channel, or channel of any other shape desired, in which the resistance element 10 is secured, the extremities of the resistance being connected respectively to the bolts 15 and 16. The resistance element 10 may be of the coil metal type, the flat metal type or of any suitable resistance element or may be built of a field coil itself.

On one face of the casing are mounted the segmental conductor strips 22 and 23, the latter being secured by the bolts 14 and 15 and the former by the bolts 16 and 17. On the opposite face of the casing, a conductor strip 24 is disposed, this being secured by a fastener 25 at one end and extending radially to the center of the casing where it is secured to a bushing 26 serving as the bearing for a spindle 27 by which the contact arm 28 and actuating arm 29 are carried, these two latter being on the opposite side of the casing from the conductor strip 24.

Fig. 6 shows the conductor strip 24 being fastened at the center of the casing, as in Fig. 2, with the fastener 25 eliminated, thus allowing the conductor strip to be adjusted to any point of the resistance coil, and in this manner varying the amount of the resistance. The conductor strip bears against the resistance coil securing its force from the spring tension at the bushing at the center of the casing. The contact arm 28, traverses the segments 22 and 23 when angular movement is imparted to the spindle 27 and this arm serves to put in circuit with the generator field coil, the resistance 10, or to cut the latter out entirely, depending on whether it is on the segment 23 or 22.

A compression spring 30 surrounds the spindle and its expansive force tends to impart axial movement of the spindle so as to keep the contact arm 28 in firm contact with the segments 22 and 23.

The actuating arm 29 extends radially beyond the casing and is formed with an eye carrying a loosely mounted insulated bushing 31, this latter being to receive the end of a connecting rod 32 by which an operative connection is effected between the actuating arm and the throttle control mechanism of the vehicle or any other movable rod, arm, governor or wire which governs the speed of the motor or any other governor or control arm governed by the speed of the motor.

In the use of the device, the connection between the third or control brush and the field coil is separated and the device electrically connected in, as by connecting the brush with the post 14 and the field coil with the post 25 or vice versa. The field excitation current will then have to pass through the device, but the resistance will not be in circuit if the arm 28 rests on the segment 23, and the current will then pass from the brush to the terminal post 14, thence over the segment 23 to the arm 28, thence through the shaft 27 and bushing 26 to the strip 24, thence from the terminal post 25 to the field coil. The resistance 10 will thus not be in circuit until the speed of the engine has been advanced by changing of the throttle lever to a point where the contact arm 28 will have passed to the segment 22. Under such a condition, the charging rate of the generator will be cut down by the inclusion of the resistance 10 in its field circuit, current passing from the third or control brush to the terminal or binding post 14, thence over the segment 23 to the bolt 15, through the resistance 10 to the bolt 16, thence over the arm 28 and to the field coil through the shaft 27, bushing 26, strip 24, and the terminal post 25.

It will thus be seen that after a predetermined speed which would otherwise result in too high a charging rate for the generator, the resistance will be automatically inserted in its field circuit, to cut down the charging rate to a safe point.

The invention having been described, what is claimed as new and useful is:

A device for the purpose indicated comprising a casing formed of complemental disks of equal thickness and means for securing the same together in facing relation, one of said disks being formed with an annular channel concentric with its axis, a resistance element disposed in said channel, a bushing passing centrally through the disks and provided with means for securing the disks together, a spindle journalled in said bushing, contact segments mounted on the outer face of the channel disk and respectively electrically connected with the extremities of the resistance, a contact arm mounted on the spindle and traversing the segment, an actuating arm connected with the spindle and terminally provided with means for operative connection with the throttle lever of an auto vehicle, and binding posts mounted on the casing disks and respectively electrically connected with the spindle and with one of said contact segments, said contact segments being arranged concentrically with the bushing and at the same radial distance therefrom and being of an angular extent equal to approximately half the angular movement of the contact arm, the segments being in end-to-end relation but slightly spaced from each other.

CHARLES B. COUSLEY.
CLARENCE MEYERS.
FRANCIS P. CLESI.